United States Patent
Kim et al.

(10) Patent No.: US 8,174,506 B2
(45) Date of Patent: *May 8, 2012

(54) METHOD OF DISPLAYING OBJECT AND TERMINAL CAPABLE OF IMPLEMENTING THE SAME

(75) Inventors: Tae Hun Kim, Incheon-si (KR); Boem Young Woo, Gyeonggi-do (KR); Jeong Hyuk Yoon, Seoul (KR); Hyun Ju Ahn, Seoul (KR); Seung Sook Han, Gyeonggi-do (KR); Jun Serk Park, Seoul (KR); Ho Sang Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

This patent is subject to a terminal disclaimer.

(21) Appl. No.: 12/648,248

(22) Filed: Dec. 28, 2009

(65) Prior Publication Data

US 2010/0099465 A1   Apr. 22, 2010

Related U.S. Application Data

(63) Continuation of application No. 11/729,807, filed on Mar. 30, 2007, now Pat. No. 7,663,610.

(30) Foreign Application Priority Data

Mar. 30, 2006   (KR) .................... 10-2006-0028933

(51) Int. Cl.
   *G09G 5/00* (2006.01)
(52) U.S. Cl. .................. 345/173; 345/156; 715/835
(58) Field of Classification Search .......... 345/156–184; 178/18.01, 18.03; 715/835, 846; 455/566
   See application file for complete search history.

(56) References Cited

U.S. PATENT DOCUMENTS

| | | | |
|---|---|---|---|
| 5,008,853 | A | 4/1991 | Bly et al. |
| 5,844,547 | A | 12/1998 | Minakuchi et al. |
| 2002/0191029 | A1 | 12/2002 | Gillespie et al. |
| 2003/0016211 | A1 | 1/2003 | Woolley |
| 2004/0021643 | A1 | 2/2004 | Hoshino et al. |
| 2006/0274046 | A1 | 12/2006 | Hillis et al. |
| 2007/0157089 | A1 | 7/2007 | Van Os et al. |

FOREIGN PATENT DOCUMENTS

| | | |
|---|---|---|
| JP | 05119946 A | 5/1993 |
| JP | 2005196810 | 7/2005 |

*Primary Examiner* — Regina Liang
(74) *Attorney, Agent, or Firm* — Birch, Stewart, Kolasch & Birch, LLP (57) ABSTRACT

A method of displaying an object and a terminal capable of implementing the same. The method includes displaying an object movable on a touchscreen of a terminal at a first position on the touchscreen; and if a first touch action is carried out on the object, fixing the object to the first position.

18 Claims, 7 Drawing Sheets

METHOD OF DISPLAYING OBJECT AND TERMINAL CAPABLE OF IMPLEMENTING THE SAME

This application is a Continuation of application Ser. No. 11/729,807, filed on Mar. 30, 2007 now U.S. Pat. No. 7,663,610, which claims the priority benefit of the Korean Patent Application No. 10-2006-0028933, filed on Mar. 30, 2006, which are hereby incorporated by reference as if fully set forth herein.

BACKGROUND OF THE INVENTION

1. Field of the Invention

The present invention relates to a terminal, and more particularly, to a method of displaying an object and a terminal capable of implementing the same. Although the present invention is suitable for a wide scope of applications, it is particularly suitable for displaying such an object as a video file, an audio file, a message and the like in a mobile terminal.

2. Discussion of the Related Art

Generally, the remarkable developments of the information communication technologies bring rapid transitions of information and communication environments. A mobile communication terminal is regarded as a necessity in a modern society to be globally used.

In order to meet the user's demand according to the base expansion of the mobile communication terminals, various functions including a short message service (SMS) function, an MMS (multimedia messaging system) function, an Internet access function as well as a general voice calling are provided to the mobile communication terminal.

Besides, as the tendency for convergence to provide various functions to one device expands, various additional functions including a multimedia play function, a photographing function, a game function and the like as well as a basic communicational function are provided to a mobile communication terminal such as a mobile phone.

To execute theses functions, an object such as a phone number, a communication list, a text/voice/multimedia message, a video file, and audio file and the like is frequently represented as an icon to be displayed on a screen of the terminal.

However, since the types and numbers of the objects tend to increase in proportion to the diversity of the functions, the demand for a method of displaying the objects more efficiently rises to provide the convenience to terminal users.

SUMMARY OF THE INVENTION

Accordingly, the present invention is directed to a method of displaying an object and a terminal capable of implementing the same that substantially obviate one or more problems due to limitations and disadvantages of the related art.

An object of the present invention is to provide a method of displaying an object and a terminal capable of implementing the same, by which various objects attributed to various functions provided within the terminal can be displayed to maximize the facilitation and convenience of a user of the terminal.

Another object of the present invention is to provide a terminal in which an object displayed on a screen of the terminal can be fixed to a particular position of the screen in response to a touch action of a terminal user.

Another object of the present invention is to provide a terminal which allows a terminal user to fix a displayed position of an object in various convenient ways.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of displaying an object in a terminal having a touchscreen according to an embodiment of the present invention includes an object displaying step of displaying the object movable on the touchscreen on a first position on the touchscreen, and an object position fixing step of, if a first touch action is carried out on the object, fixing a position of the object to the first position.

In another aspect of the present invention, a terminal includes a touch screen and a control unit controlling a movable object to be displayed at a first position on the touchscreen, the control unit controlling the displayed object to be fixed to the first position if a first touch action is carried out on the displayed object.

According to another aspect, the present invention provides A method of displaying an object in a terminal having a touchscreen, comprising: displaying the object movable on the touchscreen at a first position on the touchscreen; and if a first touch action is carried out on the object, fixing the object to the first position.

According to another aspect, the present invention provides a terminal comprising: a touchscreen to display an object movable thereon at a first position on the touch screen; and a control unit to fix the object to the first position on the touch screen, if a first touch action is carried out on the object.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention is applicable to a kiosk terminal such as ATM (automatic teller machine) and the like as well as a mobile terminal such as a mobile phone, a PDA (personal digital assistant), a PMP (portable multimedia player), a game player, and the like. In fact, the present invention is applicable to any terminal/display having a touch screen displaying an object. Yet, for convenience and simplicity of explanation in the following description and only as an example, the present invention as applied to a mobile terminal such as a mobile phone, is discussed below referring to the figures. However, it should be understood that the present invention is not limited to the following explanation and embodiments.

First of all, a configuration of a mobile terminal according to the present invention is explained with reference to FIG. 1 as follows.

Figure 1:
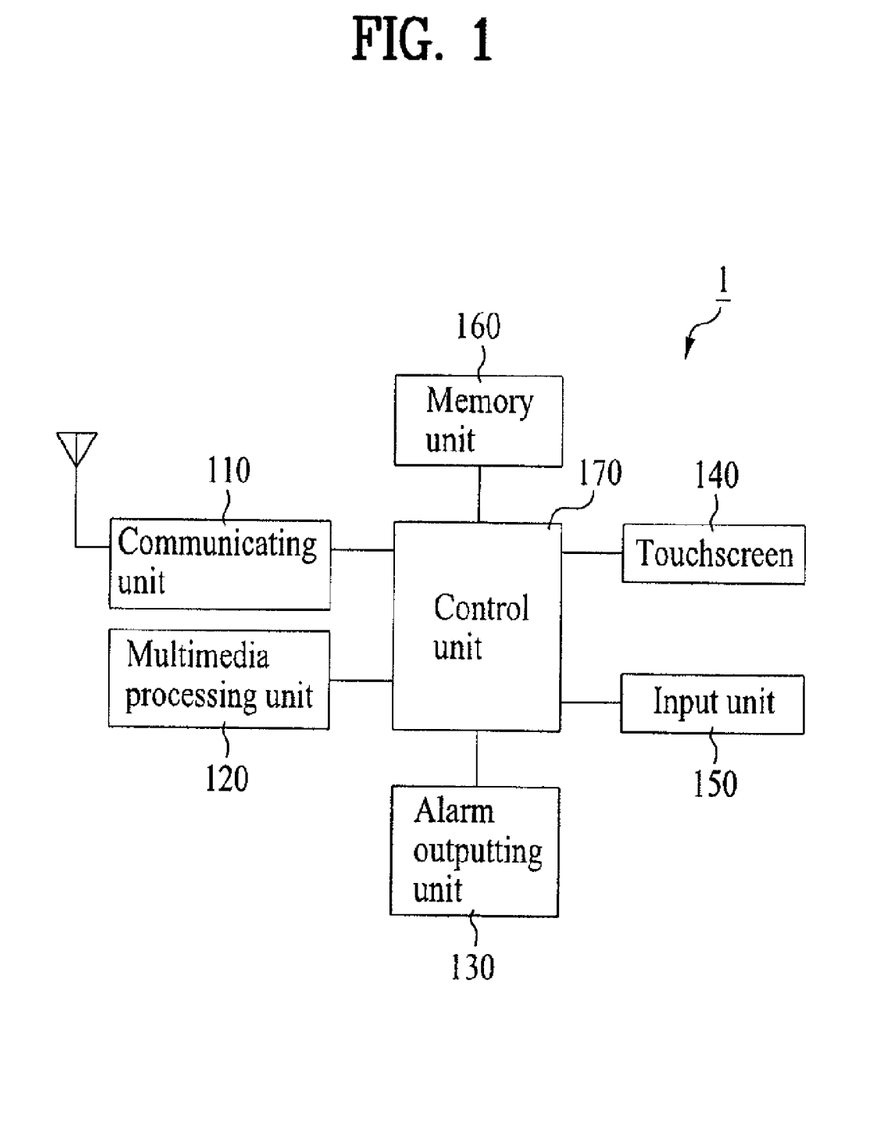
FIG. 1 is a schematic bock diagram of a mobile terminal according to an embodiment of the present invention.

FIG. 1 is a schematic block diagram of a mobile terminal 100 according to an embodiment of the present invention.

Referring to FIG. 1, the mobile terminal 100 according to the present invention preferably includes a communicating unit 110, a multimedia processing unit 120, a touchscreen 140, a memory unit 160, an input unit 150, an alarm outputting unit 130, and a control unit 170. All components of the mobile terminal 100 are operatively coupled and configured.

Of course, the mobile terminal according to the present invention can be provided with other various additional elements (e.g., a camera, etc.) as well as the aforesaid elements. Yet, since the additional elements are not directly associated with the present invention, explanations for the additional elements will be omitted in the following description in order to provide a more concise explanation of the present invention. And, the respective elements are explained as follows.

First of all, the communicating unit 110 is responsible for a mobile communication network access and RF signal transmission/reception. And, the communicating unit 110 enables the mobile terminal 100 to perform voice communication, SMS (short message service) communication, MMS (multimedia messaging service) communication with a third party via a mobile communication network. If a communication function is unnecessary for the mobile terminal 100 (e.g., in the case that the terminal 100 is not a mobile phone), the communicating unit 110 can be removed (or omitted) from the mobile terminal 100. That is, one or more components of the mobile terminal 100 shown in FIG. 1 can be components of other types of terminals such as kiosk terminals according to the present invention.

The multimedia processing unit 120 enables the mobile terminal 100 to play multimedia contents such as audio files, image files, moving picture files, and the like. If the multimedia contents play function is unnecessary for the mobile terminal 100, the multimedia processing unit 120 can be removed or omitted from the mobile terminal 100.

The memory unit 160 stores computer software (e.g., computer programs) for driving various functions provided by the mobile terminal 100 and various kinds of data associated with the software. And, the memory unit 160 is capable of storing multimedia contents such as audio files, image files, moving picture files, and the like to be reproduced by the multimedia processing unit 120. The memory unit 160 can be the internal memory and/or removable memory such as a memory stick or card.

The touchscreen 140 plays a role as a display unit for displaying a real-time operational situation of the mobile terminal 100 and pictures according to the various functions provided by the mobile terminal 100. And, the touchscreen 140 can also play a role as an input unit to receive various touch commands or information inputted by a terminal user. Moreover, the touchscreen 140 can be configured with one of a contact electrostatic capacitive type, a pressure resistive overlay type, an infrared beam detective type, a surface acoustic wave type, an integral strain gauge type, a piezoelectric type, and the like.

Besides the touchscreen 140, the input unit 150 (e.g., key pads, buttons, etc.) enables the terminal user to input various commands and information. If the touchscreen 140 alone is sufficient to receive user commands and information, the input unit 150 or a part thereof may be omitted from the mobile terminal 100 to simplify the mobile terminal 100.

The alarm outputting unit 130 preferably includes at least one of a speaker and a vibration motor. The alarm outputting unit 130 outputs sound and/or vibration to provide an alarm to a user if necessary.

The control unit 170 controls the communicating unit 110, the multimedia processing unit 120, the touchscreen 140, the memory unit 160, the input unit 150, and the alarm outputting unit 130 to enable an object displaying method according to the present invention, which will be explained in the following description, to be implemented in the mobile terminal 100 or other types of terminals. The control unit 170 controls the operation of the mobile terminal 100.

A method of displaying an object in the above configured mobile terminal 100 or other types of terminals according to one embodiment of the present invention is explained with reference to FIGS. 2 to 9 as follows.

Figure 2:
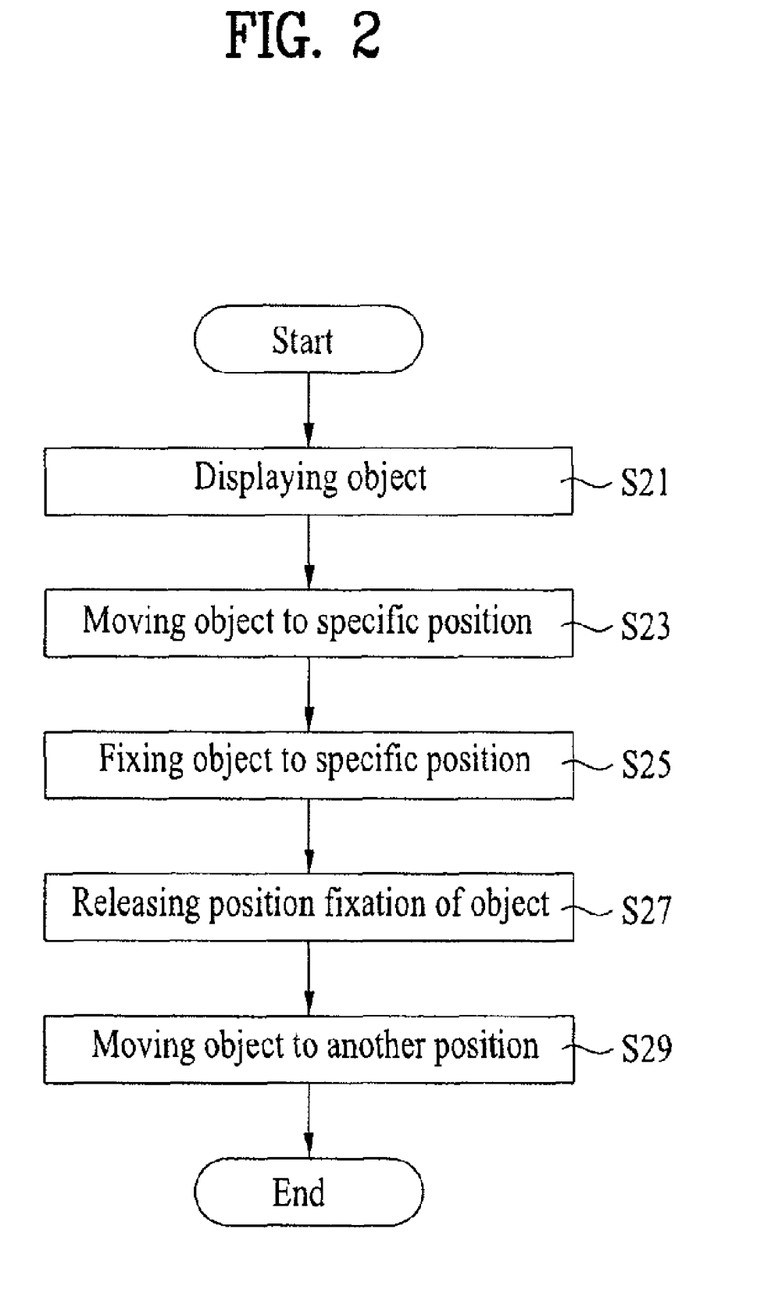
FIG. 2 is a flowchart of a method of displaying an object according to one embodiment of the present invention.

Particularly, FIG. 2 is a flowchart of a method of displaying an object according to one embodiment of the present invention, and FIGS. 3 to 9 are examples of pictures of a terminal touchscreen for executing a method of displaying an object according to one embodiment of the present invention. For the convenience of explanation for FIGS. 3 to 9, it is assumed that only one object is displayed at a time on the touchscreen. However, the present invention is not limited thereto and can be applied when multiple objects are displayed on the touch screen of the terminal at a given time. The method of FIGS. 2-9 can be implemented by the mobile terminal 100 of FIG. 1 or other suitable terminal. Here, an object can be an icon, a menu item, a character, a sign, a number, a picture, a symbol, etc. That is, an object can be any item that can be displayed on the touch screen of the terminal.

Figure 3:
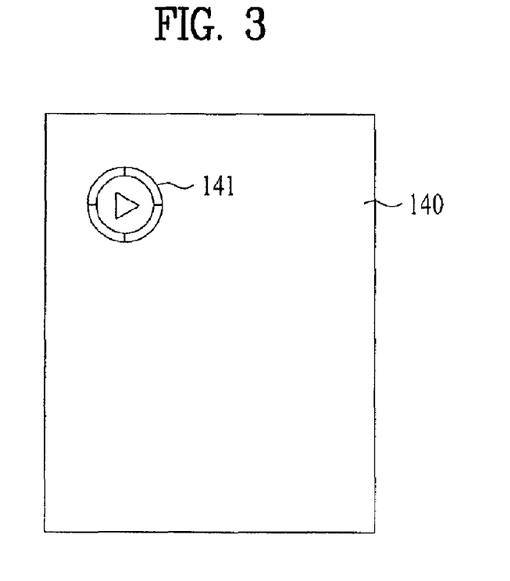
FIGS. 3 to 9 are diagrams of pictures of a terminal touch-screen for illustrating a method of displaying an object according to one embodiment of the present invention.

First of all, one object 141, as shown in FIG. 3, is displayed on the touchscreen 140 of the terminal (S21). The object 141 is movable to a random position on the touchscreen 140 as desired by the user. The object 141 can be moved in various ways. Preferably, the object 141 is touched and then dragged and dropped to a random position (or desired position) on the touch screen 140.

Figure 4:
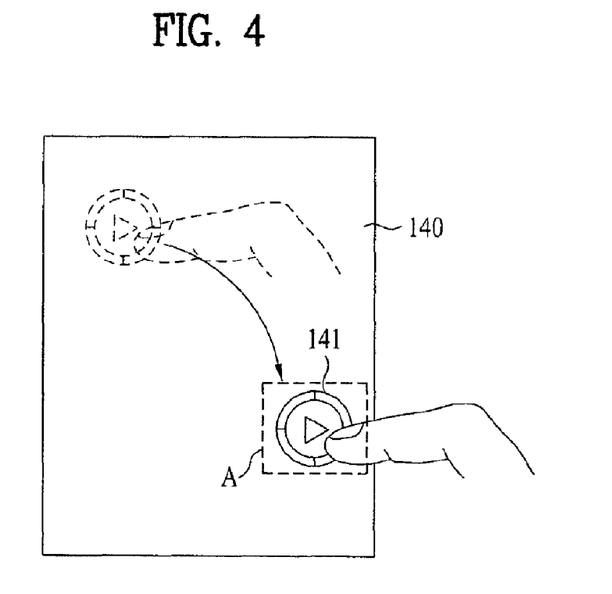

For instance, the displayed object 141 is moved from the initially displayed position (as shown in FIG. 3) to a position A specified by a terminal user (as shown in FIG. 4), e.g., by touching the object 141 at the initial position, dragging the object 141 from the initial position to the new position A, and releasing the object 141 at the new position A (S23). This is all done by the touching action of the user, e.g., by a user's finger.

Here, in this example, assume that the specified position A is a position at which the terminal user desires to fix the object 141 on the touchscreen 140. That is, this is the position on the touchscreen 140 at which the object 141 will be fixedly displayed, such that after this fixation of the object 141 to the position A, the user may not move the object 141 by touching and dragging the object 141 away from the fixed position A. The position fixation according to the present invention will be explained later. If the desired fixing position specified by the terminal user corresponds to an original display position (or initial/default display position) and the user does not wish to move the object at all, then step S23 can be skipped. The step of moving the object at step S23 can be performed any number of times as desired by the user, before the object is fixed to a particular position at step S25 discussed below.

Subsequently, one of touch actions of the terminal user, as shown in FIGS. 5A to 5D, is carried out on the currently displayed object 141, so as to perform the position fixation of the object 141 at the desired location of the touchscreen 140 (S25). Various examples of the touch actions are explained with reference to FIGS. 5A to 5D as follows. And, it is apparent to those skilled in the art that the examples of the touch actions are not limited to those shown in FIGS. 5A to 5D.

Figure 5A:
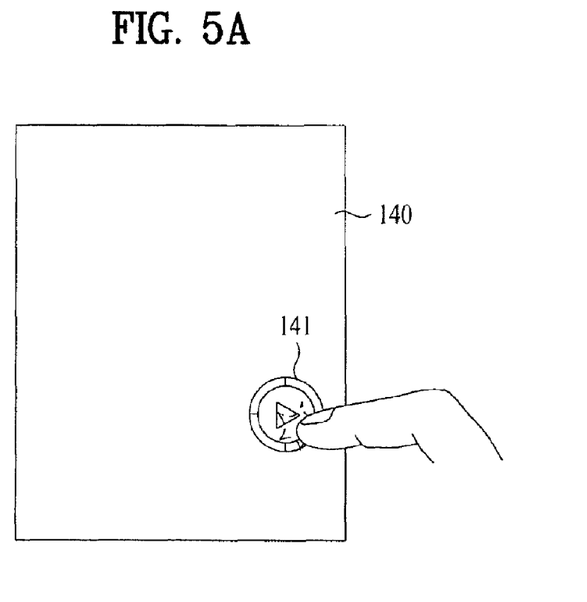

In one example, FIG. 5A shows that the object 141 can be fixed to the specified position on the touchscreen 140 if the terminal user keeps touching the object 141 during a prescribed time (e.g., for 3 seconds) at least.

Figure 5B:
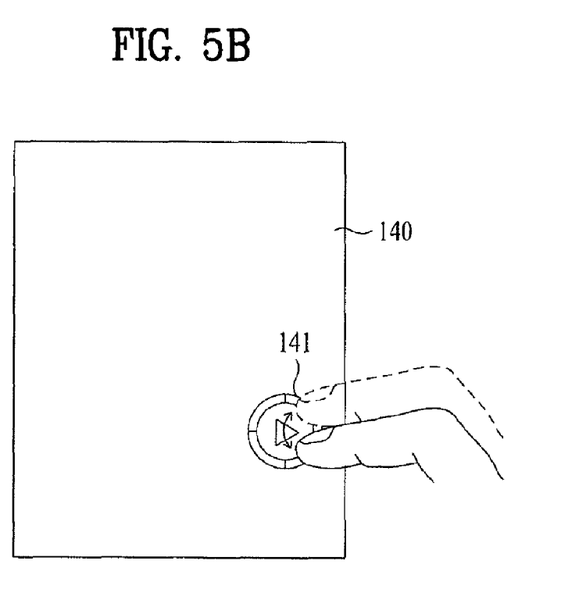

In another example, FIG. 5B shows that the object 141 can be fixed to the specified position on the touchscreen 140 if the terminal user rubs the object 141 at least a prescribed number of times or for a certain time duration.

Figure 5C:
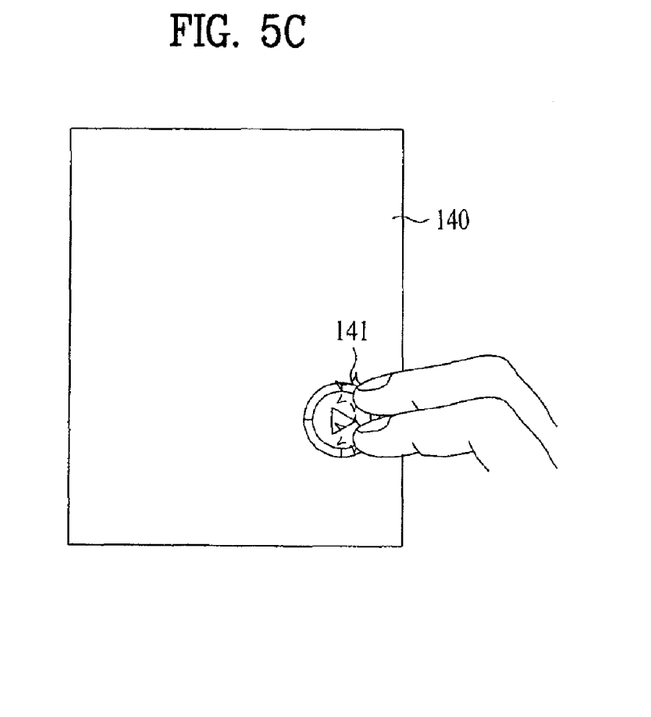

In still another example, FIG. 5C shows that the object 141 can be fixed to the specified position on the touchscreen 140 if the terminal user simultaneously touches a plurality of points on the object 141. For instance, if the user touches the object 141 using two fingers simultaneously, then the object 141 may be fixed to the position on the touchscreen 140.

Figure 5D:
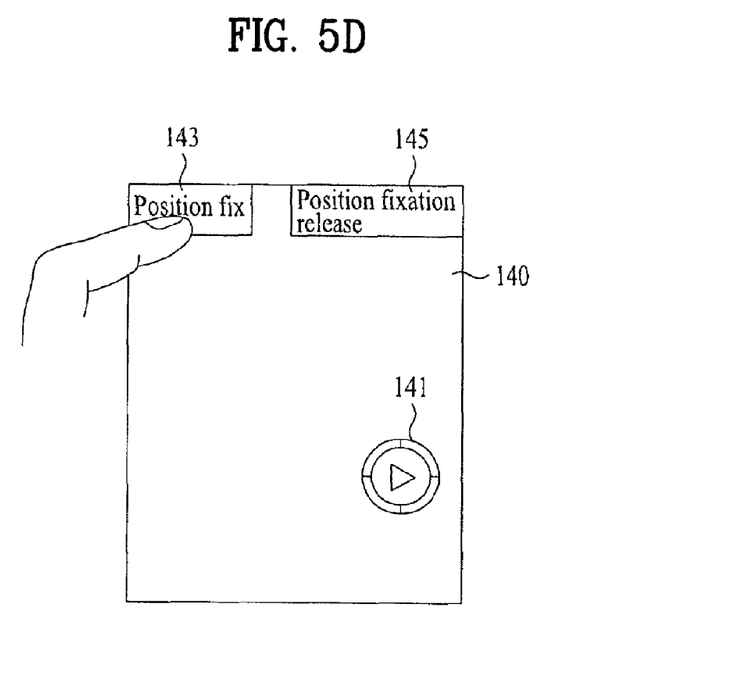

In still another example, FIG. 5D shows that the object 141 can be fixed to the specified position on the touchscreen 140 if the terminal user touches a 'position fixing' icon or menu item 143 separately provided on the touchscreen 140 while the object is selected.

Figure 6:
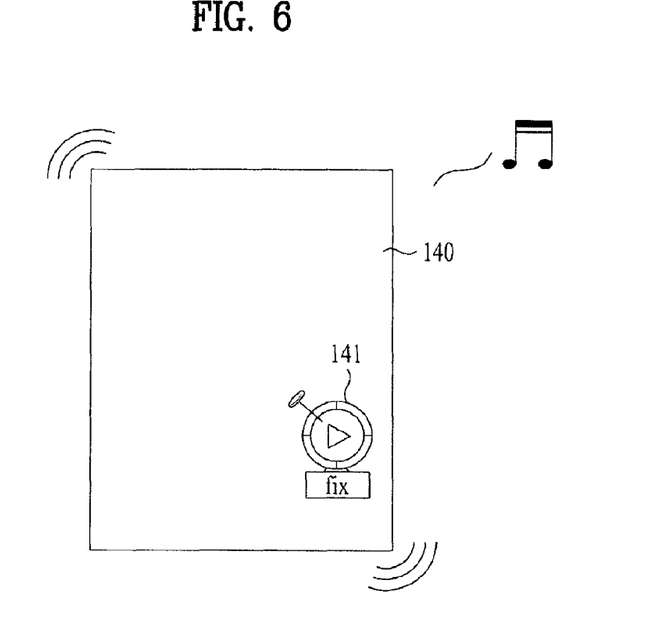

Once the object 141 is fixed to the specific position on the touch screen as shown in FIGS. 5A-5D, an indication, which informs the user that the object 141 has been fixed to the specific position on the touch screen, is provided. For instance, a shape and/or color of the fixed object 141 on the touchscreen 140, as shown in FIG. 6, can be changed to visually inform the terminal user that the object 141 is fixed to that position. In an embodiment of the present invention, the shape can include a text. In another example, an icon or graphical indication can be displayed adjacent to or attached to the fixed object. Such indication can be continuously shown to the user or can be a pop-up type display.

In the example of FIG. 6, an icon labeled "Fix" can be shown as attached to the fixed object, so that the user can know the fixation of the object. In addition or as an alternative, the alarm outputting unit 130 can output an alarm sound and/or vibration to audibly and/or tactually inform the terminal user that the object is fixed to the position on the touch screen.

Figure 7:
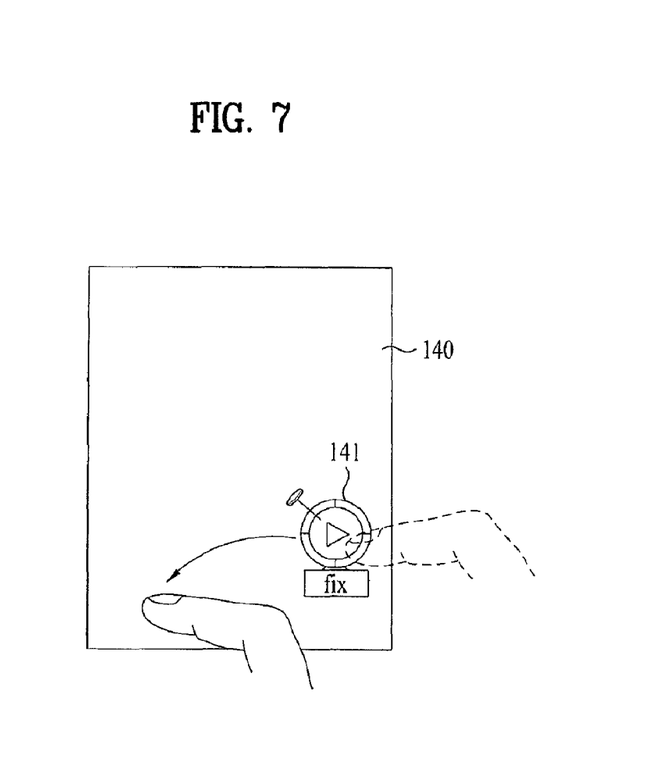

The fixed object 141, as shown in FIG. 7, is not and cannot be moved even if the terminal user touches and drags & drops the object. If the terminal user unintentionally tries to move the fixed object 141 on the touchscreen 140, the object 141 is not moved. As a result, the terminal user is able to easily find the object 141 at a prescribed position (e.g., the specified position A) on the touchscreen 140, whenever the user wants to use the object 141.

Meanwhile, if desired, a touch action for releasing the position fixation of the object can be conducted on the position-fixed object 141 by the terminal user, so that the object is no longer fixed to that position and once again can be movable on the touchscreen (S27).

The touch action for releasing the position fixation of the object is identical or similar to the aforesaid touch actions shown in FIGS. 5A to 5D. For instance, the touch action for releasing the position fixation of the object can be an action of keep touching the fixed object during a prescribed time at least, an action of rubbing the fixed object, an action of touching a plurality of points on the fixed object simultaneously, or an action of touching a 'position fixation releasing' icon 145 (FIG. 5D) while the fixed object is selected, and the like. According to an embodiment of the invention, the touch time, rubbing count, number of the simultaneously touched points of the touch actions and others associated with these touch actions for releasing the fixed object can be adjusted to vary from (or to be identical to) those of the aforesaid touch actions for the position fixation. These touch actions for releasing the fixation of the object are apparent to those skilled in the art from FIGS. 5A to 5D, of which details are omitted.

Figure 8:
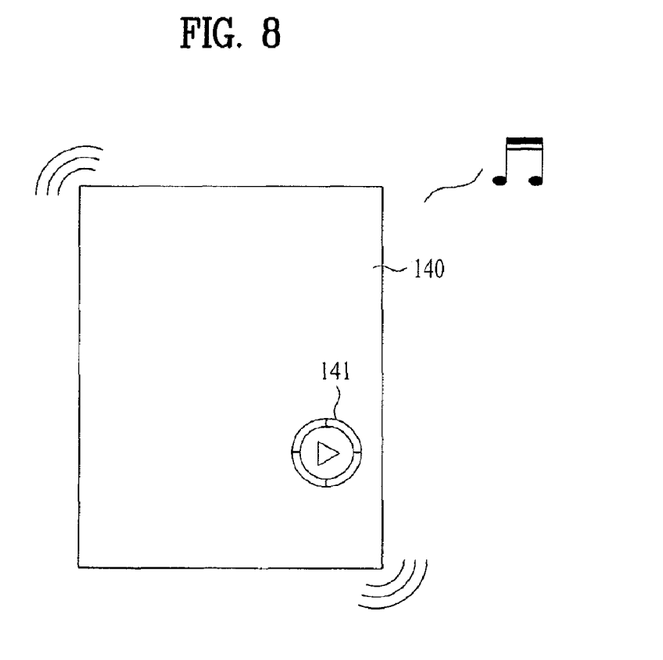

Once the position fixation of the object 141 is released, an indication, which informs the user that the position fixation of the object 141 has been released, is displayed to the user. For instance, a shape and/or color of the object, as shown in FIG. 8, can be recovered to the original shape and/or color (or to another shape and/or color) to visually inform the terminal user that the position fixation of the object is released. In another example, an icon or graphical indication displayed adjacent to or attached to the released object can be shown. Such an indication can include a text message and can be a pop-up type display. For instance, an icon labeled "Not Fixed" or "Movable" can be displayed adjacent to the released object. In addition or as an alternative, the alarm outputting unit 130 can output the alarm sound and/or vibration to audibly and tactually inform the terminal user that the position fixation of the object is released.

Figure 9:
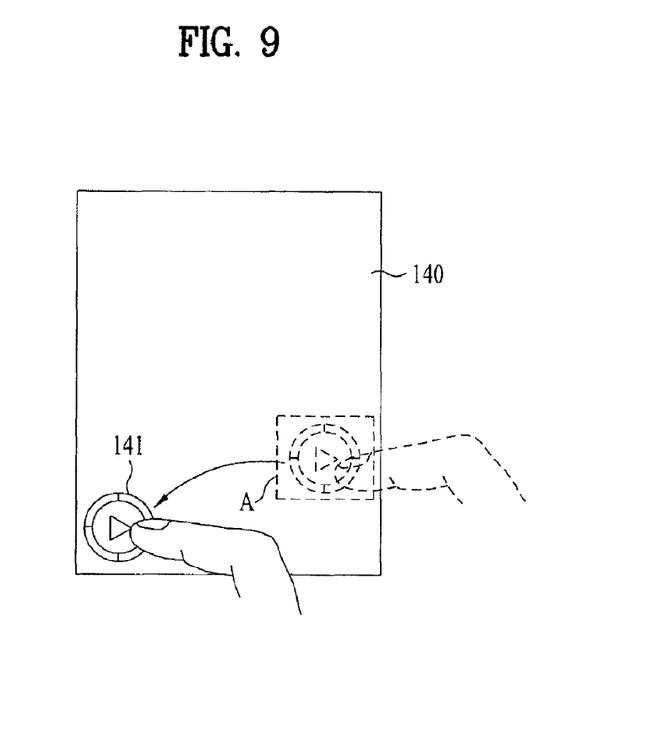

Once the position fixation of the object 141 is released, the object 141, as shown in FIG. 9, can be moved to another position from the specified position A, as desired by the user (S29).

Accordingly, the present invention provides the following effects or advantages.

First of all, a position of an object displayed on a touchscreen can be fixed according to a single touch (or touch action) on the touch screen by a terminal user (e.g., using a finger). Once the position of the object is fixed, even if the terminal user unintentionally tries to move the object by dragging and dropping the object on the touchscreen, the object is not moved. Hence, the terminal user can easily and conveniently fix the display location of any desired object on the touchscreen, whereby the user can easily locate the desired object on the touchscreen subsequently if desired.

It will be apparent to those skilled in the art that various modifications and variations can be made in the present invention without departing from the spirit or scope of the inventions. For instance, a light emitting device (LED) is provided to a terminal to emit light if a position of an object is fixed. So, the terminal can be configured to inform a terminal user of the position fixation of the object.

Thus, it is intended that the present invention covers the modifications and variations of this invention provided they come within the scope of the appended claims and their equivalents.

What is claimed is:

1. A mobile terminal comprising:
a touch screen configured to display at least one object and to sense first and second touching actions on the at least one object; and
a control unit configured to display the at least one object as being fixed and not moveable, to release the at least one object according to the second touching action such that the at least one object can be moved, to move the at least one object from a first position to a second position on the touch screen corresponding to the first touching action on the at least one object, and to fix the moved object to the second position on the touch screen based on a manipulation of a position fixing button that is separate from the first and second touching actions, wherein the first touching action is a dragging and dropping touching action on the touch screen, wherein the second touching action includes touching the at least one object for a predetermined time period, and wherein the control unit is further configured to display differently a shape of the object when the position fixation of the object is released.

2. The mobile terminal of claim 1, further comprising:
an output unit configured to output at least one of a sound and a vibration to indicate that the moved object is fixed to the second position according to a control of the control unit.

3. The mobile terminal of claim 1, wherein the control unit is further configured to differently display the shape of the object when the position fixation of the object is released by altering a shape of an upper left portion of the moved object when viewing the object such that an outline shape of the upper left portion of the moved object is altered.

4. The mobile terminal of claim 1, wherein the control unit is further configured to differently display the shape of the object by displaying an indicator on the object.

5. The mobile terminal of claim 4, wherein the indicator is displayed at one side of the object.

6. The mobile terminal of claim 5, wherein the side is an upper left portion of the object when viewing the object.

7. The mobile terminal of claim 1, wherein when the object is fixed, the fixed object is not movable at least in a vertical direction.

8. A mobile terminal comprising:
a touch screen configured to display at least one object and to sense first and second touching actions on the at least one object; and
a control unit configured to display the at least one object as being fixed and not moveable, to release the at least one object according to the second touching action such that the at least one object can be moved, to move the at least one object from a first position to a second position on the touch screen corresponding to the first touching action on the at least one object, and to fix the moved object to the second position on the touch screen based on a manipulation of a position fixing button that is separate from the first and second touching actions, wherein the first touching action is a dragging and dropping touching action on the touch screen, and wherein the second touching action includes touching the at least one object for a predetermined time period.

9. The mobile terminal of claim 8, further comprising:
an output unit configured to output at least one of a sound and a vibration to indicate that the moved object is fixed to the second position according to a control of the control unit.

10. A method of controlling a mobile terminal, the method comprising:
displaying at least one object on a touch screen of the mobile terminal;
sensing, via a sensor of the touch screen, first and second touching actions on the at least one object;
displaying the at least one object as being fixed and not moveable;
releasing the at least one object according to the second touching action such that the at least one object can be moved;
moving the at least one object from a first position to a second position on the touch screen corresponding to the first touching action on the at least one object; and
fixing the moved object to the second position on the touch screen based on a manipulation of a position fixing button that is separate from the first and second touching actions, wherein the first touching action is a dragging and dropping touching action on the touch screen, wherein the second touching action includes touching the at least one object for a predetermined time period, and wherein the method further comprises displaying differently a shape of the object when the position fixation of the object is released.

11. The method of claim 10, further comprising:
outputting at least one of a sound and a vibration to indicate that the moved object is fixed to the second position.

12. The method of claim 10, wherein the displaying differently step differently displays the shape of the object when the position fixation of the object is released by altering a shape of an upper left portion of the moved object when viewing the object such that an outline shape of the upper left portion of the moved object is altered.

13. The method of claim 10, wherein the displaying differently step differently displays the shape of the object by displaying an indicator on the object.

14. The method of claim 13, wherein the indicator is displayed at one side of the object.

15. The method of claim 14, wherein the one side is an upper left portion of the object when viewing the object.

16. The method of claim 10, wherein when the object is fixed, the fixed object is not movable at least in a vertical direction.

17. A method of controlling a mobile terminal, the method comprising:
displaying the at least one object as being fixed and not moveable;
releasing the at least one object according to the second touching action such that the at least one object can be moved;
moving the at least one object from a first position to a second position on the touch screen corresponding to the first touching action on the at least one object; and
fixing the moved object to the second position on the touch screen based on a manipulation of a position fixing button that is separate from the first and second touching actions, wherein the first touching action is a dragging and dropping touching action on the touch screen, and wherein the second touching action includes touching the at least one object for a predetermined time period.

18. The method of claim 17, further comprising:
outputting at least one of a sound and a vibration to indicate that the moved object is fixed to the second position according to a control of the control unit.

* * * * *